(12) United States Patent
Ichim et al.

(10) Patent No.: US 12,508,287 B2
(45) Date of Patent: Dec. 30, 2025

(54) TREATMENT OF CEREBRAL PALSY USING FIBROBLASTS

(71) Applicant: SPINALCYTE LLC, Houston, TX (US)

(72) Inventors: Thomas Ichim, San Diego, CA (US); Pete O'Heeron, Houston, TX (US)

(73) Assignee: Spinalcyte LLC, Houston, TX (US)

( * ) Notice: Subject to any disclaimer, the term of this patent is extended or adjusted under 35 U.S.C. 154(b) by 631 days.

(21) Appl. No.: 17/760,318

(22) PCT Filed: Feb. 12, 2021

(86) PCT No.: PCT/US2021/017998
§ 371 (c)(1),
(2) Date: Aug. 8, 2022

(87) PCT Pub. No.: WO2021/163594
PCT Pub. Date: Aug. 19, 2021

(65) Prior Publication Data
US 2023/0098890 A1 Mar. 30, 2023

Related U.S. Application Data

(60) Provisional application No. 62/976,048, filed on Feb. 13, 2020.

(51) Int. Cl.
*A61K 31/00* (2006.01)
*A61K 35/33* (2015.01)
*A61P 21/00* (2006.01)

(52) U.S. Cl.
CPC .............. *A61K 35/33* (2013.01); *A61P 21/00* (2018.01)

(58) Field of Classification Search
CPC .................................................. A61K 31/00
See application file for complete search history.

(56) References Cited

U.S. PATENT DOCUMENTS

2008/0292597 A1  11/2008  Steenblock

FOREIGN PATENT DOCUMENTS

| JP | 2009509943 | 3/2009 |
|----|------------|--------|
| JP | 2015078225 | 4/2015 |
| JP | 2015510889 | 4/2015 |
| WO | WO 2015/179227 | 11/2015 |

OTHER PUBLICATIONS

Jiao et al., "A new approach to cerebral palsy treatment: discussion of the effective components of umbilical cord blood and its mechanisms of action," Cell Transplantation 28(5):497-509, 2019.*
Wang et al. "Therapeutic potential of umbilical cord mesenchymal stromal cells transplantation for cerebral palsy: A Case Report", *Case Reports in Transplantation*, vol. 2013, 4 pages.
Arbelaez-Quintero et al., "To Use or Not to Use Metformin in Cerebral Ischemia: A Review of the Application of Metformin in Stroke Rodents," Stroke Research and Treatment, vol. 2017, pp. 1-13, 2017.
Cho et al., "Oxytocin alleviates cellular senescence through oxytocin receptor-mediate extracellular signal-regulated kinase/Nrf2 signalling," British Journal of Dermatology, 181(6):1216-1225, 2019.
Denu et al., "Fibroblasts and Mesenchymal Stromal/Stem Cells Are Phenotypically Indistinguishable," Acta Haematologica, 136(2):85-97, 2016.
Extended European Search Report issued in European Patent Application No. 21754451.9, dated Dec. 14, 2023.
Huber et al., "Effect of highly purified human chorionic gonadotropin preparations on the gene expression signature of stromal cells derived from endometriotic lesions: potential mechanisms for the therapeutic effect of human chorionic gonadotropin in vivo," Fertility and Sterility, 88(4):1232-1239, 2007.
Chahine et al., "Treatment of Cerebral Palsy with Stem Cells: A Report of 17 Cases," International Journal of Stem Cells, 9(1):90-95, 2016.
Feng et al., "Safety of Allogeneic Umbilical Cord Blood Stem Cells Therapy in Patients with Severe Cerebral Palsy: A Retrospective Study," Stem Cells International, vol. 2015, Article ID 325652, pp. 1-7, 2015.
Fu et al., "Synergistic Improvement in Children with Cerebral Palsy Who Underwent Double-Course Human Wharton's Jelly Stem Cell Transplantation," Stem Cells International, vol. 2019, Article ID 7481069, pp. 1-11, 2019.
Chim et al., "Fibroblasts as a practical alternative to mesenchymal stem cells," Journal of Translational Medicine, vol. 16, No. 1, Article 212, pp. 1-9, 2018.
PCT International Search Report and Written Opinion issued in International Application No. PCT/US2021/017998, dated Jun. 3, 2021.

* cited by examiner

*Primary Examiner* — Rosanne Kosson
(74) *Attorney, Agent, or Firm* — Norton Rose Fulbright US LLP

(57) ABSTRACT

In some aspects, disclosed herein are methods and compositions for treatment or prevention of cerebral palsy using fibroblasts or derivatives thereof. Disclosed herein are fibroblasts and derivatives thereof capable of inducing neurogenesis and/or reducing inflammation in a subject. In some cases, the disclosed methods comprise use of conditioned fibroblasts. Fibroblasts may be conditioned with agents capable of enhancing therapeutic efficacy, for example oxytocin and/or human chorionic gonadotrophin (hCG).

11 Claims, No Drawings

TREATMENT OF CEREBRAL PALSY USING FIBROBLASTS

This application is a national phase application under 35 U.S.C. § 371 that claims priority to International Application No. PCT/US2021/017998, filed Feb. 12, 2021, which claims priority to U.S. Provisional Patent Application Ser. No. 62/976,048, filed Feb. 13, 2020, and each application is incorporated by reference herein in its entirety.

TECHNICAL FIELD

Embodiments of the disclosure encompass at least the fields of cell biology, molecular biology, and medicine.

BACKGROUND

The condition referred to as cerebral palsy (CP) is a collective name given to a range of disorders resulting in physical disability caused by brain injury which occurs either perinatally (before, at, or around the time of birth), or during the first few years of an infant's life while the brain is still developing. Risk factors for CP that may negatively affect neuronal health include, for example, neonatal cerebral hypoxia-ischemia, intraparenchymal or intraventricular hemorrhage, and neonatal sepsis. Symptoms of CP can be very different between people with this group of disorders. Symptoms may in some cases be mild or severe, only involve one side of the body or both sides, be more pronounced in either the arms or legs, or involve both the arms and legs. Symptoms are usually seen before a child is 3 years old, and in some cases may be present or identified at birth.

There are several different types of CP, including spastic, dystonic, dyskinetic, ataxic, hypotonic, and mixed. Symptoms of spastic CP, the most common type, include: tight muscles that do not stretch (which may tighten up further over time), abnormal gait and postural movements (arms tucked in toward the sides, knees crossed or touching, legs make "scissors" movements, walking on the toes), joints that are tight and do not open up all the way (called joint contracture), and muscle weakness or loss of movement in a group of muscles (paralysis). The symptoms may affect one arm or leg, one side of the body, both legs, or both arms and legs. At the present time, therapeutic hypothermia (head or body cooling) is the only effective intervention for neonatal brain hypoxia-ischemia, which is a major risk factor for CP. With no current cure, physicians mainly attempt to prevent CP by improving obstetric care and minimizing the key CP pre- and perinatal risk factors such as prematurity, low birth weight and perinatal infection. Magnesium sulfate has recently been shown to decrease the risk of CP in very preterm infants, although it has not yet been implemented into clinical practice. Therefore, magnesium sulfate's real life effectiveness is not yet known.

It is recognized that CP is the most frequent cause of severe motor disability in childhood with a background prevalence of two per thousand live births. The condition is defined as a permanent disorder of the development of movement and posture, causing activity limitation, that is attributed to non-progressive disturbances that occurred in the developing fetal or infant brain. In the majority of cases, the original "disturbance" is the occurrence of ischemic-hypoxic injury to the periventricular cerebral white matter, which is similar in principle to ischemic injuries in adults.

Autopsy samples from patients with CP reveal white-matter injury, germinal matrix hemorrhage with intraventricular extension, and injury to the cortex, basal ganglia, and thalamus. Causative factors are believed to be direct ischemia/hypoxia insult, or in some cases maternal infection, both of which culminate in causing inflammatory cytokine activation in the fetal CNS, demylination and excitotoxicity. Supporting these mechanisms of CP induction are animal models in which induction of ischemia/hypoxia, glutamate excitotoxicity, or mediators of bacterial/viral pathogens in the perinatal period elicit neurobehavioral defects similar to CP.

At present the treatment for CP is symptomatic, including administration of Baclofen (Liorisol®) as a muscle relaxant to decrease the hypertonia associated with CP. Additionally, therapeutic electrical stimulation (TES) is used in some cases to increase blood flow to weakened muscles to allow the body to deliver more growth factors and nutrients to repair damaged tissue. Another technique is Selective Dorsal Rhizotomy (SDR), which involves surgically cutting some of the sensory nerve fibers that come from the muscles and enter the spinal cord. This allows better balance in the spinal cord and reduces spasms, but does require a commitment to physical therapy following treatment.

BRIEF SUMMARY

The present disclosure is directed to methods and compositions for the treatment or prevention of cerebral palsy in an individual, or onset in its delay and/or reduction in its severity. In specific embodiments, the lifespan of the individual is extended compared to in the absence of use of the methods and compositions. Disclosed herein, in some embodiments, is a method of treating or preventing cerebral palsy in a subject comprising providing to the subject an effective amount of fibroblasts. In some embodiments, the subject is about four years of age or less. In some embodiments, the subject is about two years of age or less. In some embodiments, the subject is a neonate. In some embodiments, the neonate is a preterm neonate. In some embodiments, the fibroblasts are fibroblasts isolated from placenta, cord blood, peripheral blood, omentum, hair follicle, skin, bone marrow, adipose tissue, or Wharton's Jelly. In some embodiments, the fibroblasts are capable of proliferating in vitro at a rate of between 14 and 21 hours per cell multiplication. In some embodiments, the fibroblasts are capable of secreting interleukin-1 (IL-1) when cultured in vitro. In some embodiments, the fibroblasts are capable of secreting between 1 pg and 77 pg of IL-1 per 1 million fibroblasts when cultured at a confluency of about 75%. In some embodiments, the fibroblasts secrete fibroblast growth factor 1 (FGF-1) when cultured in vitro. In some embodiments, the fibroblasts are capable of secreting between 1 pg and 500 pg of FGF-1 per 1 million fibroblasts when cultured at a confluency of about 75%. In some embodiments, the fibroblasts are capable of reducing T cell proliferation in a mixed lymphocyte reaction. In some embodiments, reducing T cell proliferation comprises reducing T cell proliferation greater than 20% as compared to a control mixed lymphocyte reaction.

In some embodiments, the method further comprises, prior to the providing, culturing the fibroblasts with human chorionic gonadotropin (hCG). In some embodiments, the fibroblasts are cultured with the hCG at a concentration of between 1 nM and 1 µM per 1 million fibroblasts. In some embodiments, the fibroblasts are cultured with the hCG at a concentration of between 10 nM and 100 nM per 1 million fibroblasts. In some embodiments, the method further comprises, prior to the providing, culturing the fibroblasts with oxytocin. In some embodiments, the method further comprises, prior to the providing, culturing the fibroblasts with metformin. In some embodiments, the fibroblasts do not express IL-1. In some embodiments, the method further comprises providing to the subject a neuroprotective agent. In some embodiments, the neuroprotective agent is erythropoietin, human chorionic gonadotropin, metformin, GLP-1, dimethylsulfoxide, felbamate, TGF-beta, aurintricarboxylic acid, amlodipine, MK-801, memantine, irbesartan, ebselen, green tea extract, BMP-6, minocycline, doxycycline, or ceftriaxone.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description. It is to be expressly understood, however, that the Detailed Description is provided for the purpose of example and description only and is not intended as a definition of the limits of the present disclosure.

DETAILED DESCRIPTION

Cerebral palsy (CP) development, whether due to maternal infections or ischemic/hypoxia insults, for example, appear to have common features. One specific example is local or systemic inflammation in the CP patient. Systemic elevations of inflammatory cytokines such as TNF-alpha, and responsiveness to toll like receptor signaling have been reported in patients with CP. Other inflammatory cytokines that have been associated with CP include IL-18, IFN-γ, and IL-12. Other commonalities found in CP patients include evidence of chronic demyelination, white matter loss, and excitotoxy causing neuronal loss. The inflammatory hypothesis of CP is supported by studies in animal models, in which various neurological insults are induced, but lead to a common disease phenotype. Specifically, animal models of CP include: a) excitotoxic damage induced by day 5 neonatal intra-cortical injections of ibotenate, a glutamatergic agonist; b) ischemic/hypoxic damage caused by unilateral or bilateral occlusion of carotid arteries followed by 1-2 hour exposure to 6-8% oxygen environment; and c) inflammatory injury induced by administration of endotoxin alone or in combination with ischemia/hypoxia/glutameteric agonist. All these animal models develop similar brain injury, demyelination and neurobehavioral abnormalities similar to each other, and to clinical CP. Several clinical reports suggest mesenchymal stem cells may induce neuroregeneration, which could potentially be of benefit to CP patients. This is supported by studies in animal models of CP that have been treated with stem cells and underwent recovery. Additionally, the anti-inflammatory effects of mesenchymal stem cells may potentially allow for endogenous repair processes to occur, which normally would be blunted by inflammation. Recognized herein is a need for therapeutics capable of treating the underlying causes of cerebral palsy such as, for example, cellular therapeutics having anti-inflammatory properties.

Disclosed herein, in some embodiments, are methods, means, and compositions of matter useful for treatment of neonatal brain injury and its after effects, including cerebral palsy. Embodiments of the disclosure provide administration of fibroblasts (e.g., regenerative fibroblasts) to a patient suffering from or at risk for developing cerebral palsy. Fibroblasts may be provided alone or in combination with one or more additional therapies. For example, fibroblasts may be provided together with a means of neural stimulation. Example means of neural stimulation include administration of agents that activate endogenous neural stem cells and transcranial magnetic stimulation.

II. Examples of Definitions

In keeping with long-standing patent law convention, the words "a" and "an" when used in the present specification in concert with the word comprising, including the claims, denote "one or more." Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

Throughout this application, the term "about" is used according to its plain and ordinary meaning in the area of cell and molecular biology to indicate that a value includes the standard deviation of error for the device or method being employed to determine the value.

As used herein, "allogeneic" refers to tissues or cells or other material from another body that in a natural setting are immunologically incompatible or capable of being immunologically incompatible, although from one or more individuals of the same species.

As used herein, "cell line" refers to a population of cells formed by one or more subcultivations of a primary cell culture. Each round of subculturing is referred to as a passage. When cells are subcultured, they are referred to as having been passaged. A specific population of cells, or a cell line, is sometimes referred to or characterized by the number of times it has been passaged. For example, a cultured cell population that has been passaged ten times may be referred to as a P10 culture. The primary culture, i.e., the first culture following the isolation of cells from tissue, is designated P0. Following the first subculture, the cells are described as a secondary culture (P1 or passage 1). After the second subculture, the cells become a tertiary culture (P2 or passage 2), and so on. It will be understood by those of skill in the art that there may be many population doublings during the period of passaging; therefore the number of population doublings of a culture is greater than the passage number. The expansion of cells (i.e., the number of population doublings) during the period between passaging depends on many factors, including but not limited to seeding density, substrate, medium, growth conditions, and time between passaging.

As used herein, "conditioned medium" describes medium in which a specific cell or population of cells has been cultured for a period of time, and then removed, thus separating the medium from the cell or cells. When cells are cultured in a medium, they may secrete cellular factors that can provide trophic support to other cells. Such trophic factors include, but are not limited to hormones, cytokines, extracellular matrix (ECM), proteins, vesicles, antibodies, and granules. In this example, the medium containing the cellular factors is conditioned medium.

As used herein, a "trophic factor" describes a substance that promotes and/or supports survival, growth, proliferation and/or maturation of a cell. Alternatively or in addition, a trophic factor stimulates increased activity of a cell.

The term "comprising," which is synonymous with "including," "containing," or "characterized by," is inclusive or open-ended and does not exclude additional, unrecited elements or method steps. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

The terms "reduce," "inhibit," "diminish," "suppress," "decrease," "prevent" and grammatical equivalents (including "lower," "smaller," etc.) when in reference to the expression of any symptom in an untreated subject relative to a treated subject, mean that the quantity and/or magnitude of the symptoms in the treated subject is lower than in the untreated subject by any amount that is recognized as clinically relevant by any medically trained personnel. In one embodiment, the quantity and/or magnitude of the symptoms in the treated subject is at least 10% lower than, at least 25% lower than, at least 50% lower than, at least 75% lower than, and/or at least 90% lower than the quantity and/or magnitude of the symptoms in the untreated subject.

As used herein, the term "therapeutically effective amount" is synonymous with "effective amount", "therapeutically effective dose", and/or "effective dose" and refers to the amount of compound that will elicit the biological, cosmetic or clinical response being sought by the practitioner in an individual in need thereof. As one example, an effective amount is the amount sufficient to reduce immunogenicity of a group of cells. The appropriate effective amount to be administered for a particular application of the disclosed methods can be determined by those skilled in the art, using the guidance provided herein. For example, an effective amount can be extrapolated from in vitro and in vivo assays as described in the present specification. One skilled in the art will recognize that the condition of the individual can be monitored throughout the course of therapy and that the effective amount of a compound or composition disclosed herein that is administered can be adjusted accordingly.

As used herein, the terms "treatment," "treat," or "treating" refers to intervention in an attempt to alter the natural course of the individual or cell being treated, and may be performed either for prophylaxis or during the course of pathology of a disease or condition. Treatment may serve to accomplish one or more of various desired outcomes, including, for example, preventing occurrence or recurrence of disease, alleviation of symptoms, and diminishment of any direct or indirect pathological consequences of the disease, preventing metastasis, lowering the rate of disease progression, amelioration or palliation of the disease state, and remission or improved prognosis.

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments.

A variety of aspects of this disclosure can be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range as if explicitly written out. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. When ranges are present, the ranges may include the range endpoints.

The term "subject," as used herein, may be used interchangeably with the term "individual" and generally refers to an individual in need of a therapy. The subject can be a mammal, such as a human, dog, cat, horse, pig or rodent. The subject can be a patient, e.g., have or be suspected of having or at risk for having cerebral palsy. The subject may have a disease or be suspected of having the disease. The subject may be asymptomatic. The subject may be of any gender. The subject may be of a certain age, such as 4 years of age or less, 3 years of age or less, 2 years of age or less, 1 year of age or less, 11 months or less, 10 months or less, 9 months or less, 8 months or less, 7 months or less, 6 months or less, 5 months or less, 4 months or less, 3 months or less, 2 months or less, 1 month or less, 3 weeks or less, 2 weeks or less, 1 week or less, 6 days or less, 5 days or less, 4 days or less, 3 days or less, 2 days or less, 1 day or less, or in utero. If the subject is in utero, the subject may be 20, 21, 22, 23, 24, 25, 26, 27, 28, 29, 030, 31, 32, 33, 34, 35, 36, 37, 38, 39, or 40 weeks of age.

III. Methods and Compositions for Disease Treatment or Prevention

Aspects of the disclosure are directed to methods and compositions for treatment or prevention of cerebral palsy. Disclosed herein, in some embodiments, are fibroblasts capable of treating or preventing cerebral palsy in an individual. Fibroblasts of the present disclosure may be used in, for example, reducing inflammation, stimulating angiogenesis, and/or stimulating neurogenesis in an individual suffering from or at risk for cerebral palsy. In some embodiments, the disclosed methods comprise providing an effective amount of fibroblasts to an individual to treat or prevent cerebral palsy, or to reduce its severity and/or delay on the onset.

Risk factors for congenital cerebral palsy includes, for example, low birthweight (less than 5, 4, or 3 pounds); premature birth (before week 37, 36, 35, 34, 33, 32, 31, or 30); multiple births (twins, triplets, quadruplets, etc.); assisted reproductive technology infertility treatments; infections during pregnancy (including that lead to increases in cytokines in the brain and blood of the baby during pregnancy; examples including chickenpox, rubella, cytomegalovirus, bacterial infections, etc.); jaundice; kernicterus; mothers with thyroid problems, mothers with intellectual disability; and/or birth complications, such as detachment of the placenta, uterine rupture, umbilical cord problems). Risk factors for acquired cerebral palsy (brain damage that occurs more than 28 days after birth) are usually associated with an infection, such as meningitis, or head injury and include problems with blood flow to the brain, such as cerebrovascular accidents, stroke, brain bleeding from blood clotting problem, blood vessels that did not form properly, heart defect present at birth, or sickle cell disease.

In some embodiments, fibroblasts are cultured with one or more agents capable of enhancing therapeutic properties of the fibroblasts. In some embodiments, fibroblasts are cultured with an agent capable of enhancing immune modulation properties of the fibroblasts. In some embodiments, fibroblasts are cultured with an agent capable of enhancing neurogenesis properties of the fibroblasts. Fibroblasts may be cultured with one or more agents before providing the fibroblasts to an individual. In some embodiments, fibroblasts are cultured with an effective amount of oxytocin. In some embodiments, fibroblasts are cultured with an effective amount of human chorionic gonadotropin (hCG). In some embodiments, fibroblasts are cultured with an effective amount of metformin.

Fibroblast cells of the present disclosure may be used to secrete one or more angiogenic hormones including, but not limited to, vascular growth factor, endothelial cell growth factor, a combination thereof, and the like. Fibroblasts may be used to induce angiogenesis within a tissue in which various progenitor cells are present. Thus, in some embodiments, the disclosure provides a method of promoting neovascularization within a tissue using fibroblasts. The fibroblasts may be introduced to the desired tissue under conditions sufficient for the fibroblasts to produce the angiogenic hormone. The presence of the hormone within the tissue may promote neovascularization within the tissue.

In some embodiments, fibroblasts are provided to an individual via administration to the central nervous system (CNS). The precise mode of administration to the CNS may be varied depending on factors including disease type, the age of the individual, etc. In some embodiments, fibroblasts are administered to the CNS by intracerebral or intravascular transplantation. In some embodiments, fibroblasts are introduced to the desired site by direct injection. In some embodiments, fibroblasts are administered to the brain of an individual by direct transplantation. In some embodiments, fibroblasts are administered to the CNS of an individual (e.g., the spinal cord), by simple injection.

The administration of fibroblasts may be utilized based on examples from the use of mesenchymal stem cells for treatment of CP. For example, Chen et al utilized an ex vivo differentiation protocol to generate neural-like stem cells from autologous mesenchymal stem cells, and subsequently assessed their effects on CP patients. Sixty patients with moderate-to-severe cerebral palsy, were enrolled into an open-label, non-randomised, observer-blinded controlled clinical study with a 6-months follow-up. For the transplantation group, a total of 30 cerebral palsy patients received an autologous NSC-like cells transplantation ($1\text{-}2\times10^7$ cells into the subarachnoid cavity) and rehabilitation treatments whereas 30 patients in the control group only received rehabilitation treatment. The gross motor function measurement scores in the transplantation group were significantly higher at month 3 (the score increase was 42.6, 95% CI: 9.8-75.3, P=0.011) and month 6 (the score increase was 58.6, 95% CI: 25.8-91.4, P=0.001) post-treatment compared with the baseline scores. The increase in the Gross Motor Function Measurement scores in the control group was not significant. The increases in the language quotients at months 1, 3, and 6 post-treatment were not statistically significant when compared with the baseline quotients in both groups. All the 60 patients survived, and none of the patients experienced serious adverse events or complications. In order to further define whether administration of umbilical cord derived mesenchymal stem cells possess therapeutic effects on CP, Wang et al recruited 8 pairs (16 individuals) of identical twins with CP and administered allogenic umbilical cord derived mesenchymal stem cells by means of subarachnoid injection. The gross motor function measure (GMFM) and the fine motor function measure (FMFM) were performed before and 1 and 6 months after the treatment to analyze the results of individuals before and after the therapy, between two individuals of an identical twin and among twin pairs. Repeated-measured data variance was used to analyze the GMFM and FMFM scores of patients before and 1 and 6 months after the therapy. The study reported that all the 8 pairs (16 individuals) of children had significant improvement in the GMFM at the end of the 1st and 6th months after the therapy compared with that before the therapy, whereas the amelioration of the FMFM was not statistically significant. The improvements in motor functions between two individuals of an identical twin but not among twin pairs were correlated. The authors concluded by hypothesizing that hereditary factors contribute to the mechanisms of mesenchymal stem cell mediated motor function improvement in children with CP. Several cases reports were published on treatment of CP with mesenchymal stem cells. In the first case report, an 11-year-old boy had a clear history of dystocia and asphyxia after birth; at the age of 6 months, the family members observed that his gaze roamed and noted that he displayed a lack of attention. A brain MRI examination at the age of 7 years showed that the child had cerebral palsy with visual impairment (i.e., posterior visual pathway injury). The patient was hospitalized for 20 days and was given four infusions of intravenous autologous bone marrow derived mesenchymal stem cells. Before transplantation and 1, 6, and 12 months after transplantation, a visual evoked potential test, an electrocardiogram, routine blood tests, and liver and kidney function tests were performed. The patient did not have any adverse reactions during hospitalization or postoperative follow-up. After discharge, the patient could walk more smoothly than he could before transplantation; furthermore, his vision significantly improved 6 months after transplantation, which was also supported by the electrophysiological examinations. A second case reported involved administration of umbilical cord derived mesenchymal stem cells. The long term follow-up of the patient in the first stem cell transplant was performed when the child was 6 months and followed up for 5 years. The patient received 4 infusions of intravenous umbilical cord derived mesenchymal stem cells in each course and received 4 courses of transplantation totally. A series of assessments were performed before the first transplantation, including laboratory tests, CDCC Infant Mental Development Scale, and Gross Motor Function Measure-88

(GMFM-88). Then annual assessments using the GMFM-88, Ashworth spasm assessment, and comprehensive function assessment scale were made in addition to the annual laboratory tests. In addition, electroencephalography and brain magnetic resonance imaging were conducted before transplantation and in the follow-up phase. Rehabilitation and safety follow-up have been ongoing for 5 years up to date. There were no complaint about adverse effects during hospitalization or postoperative follow-up. Motor function recovered to normal level according to the evaluation of scales. Language function improved significantly. Linguistic rehabilitation therapy was enhanced for further improvement. This report is important because it shows improvement on several parameters, as well as suggesting potential synergies between mesenchymal stem cell therapy and effective rehabilitation programs. The third case report described a 5-year-old girl with CP who was treated with multiple times of intravenous and intrathecal administration of MSCs derived from her young sister and was followed up for 28 months. The gross motor dysfunction was improved. Other benefits included enhanced immunity, increased physical strength, and adjusted speech and comprehension. Temporary low-grade fever was the only side effect during the treatment. The authors concluded that mesenchymal stem cells may be a safe and effective therapy to improve symptoms in children with cerebral palsy.

In some embodiments, the disclosed methods comprise administering fibroblasts intravenously to an individual following an ischemic event to reduce the ischemic penumbra in the individual, thereby preventing cell death and cerebral palsy development. In some embodiments, fibroblasts are provided together with and enhance the activity of one or more neuroprotective compounds. Examples of neuroprotective compounds include calcium channel antagonists, N-methyl-D-aspartate (NMDA) receptor antagonists, free radical scavengers, anti-intercellular adhesion molecule 1 antibody, GM-1 ganglioside, gamma.-aminobutyric acid agonists, and/or sodium channel antagonists.

In some embodiments, fibroblasts are provided in combination with one or more TNF-α inhibitors. A TNF-α inhibitor may be any agent capable of preventing TNF-α from binding to or activating a TNF-α receptor. In some embodiments, the TNF-α inhibitor is cycloheximide, auranofin, sodium aurothiomalate, Leukotriene B4, interleukin-4, interleukin-13, polymyxin B, bile acids, interleukin-6, lactulose, oxpentifylline, mometasone, glucocorticoids, colchicine, chloroquine, FK-506, berberine, resveratrol, pterostilbene, vitamin A, vitamin C, cyclosporine, phosphodiesterase inhibitors such as vinpocetine, milrinone, CI-930, rolipram, nitroquazone, zaprinast, synthetic lipid A, amrinone, N-acetylcysteine, dithiocarbamates and metal chelators, exosurf synthetic surfactant, dehydroepiandrosterone, delta-tetrahydrocannabinol, phosphatidylserine, TCV-309, a PAF antagonist, thalidomide, a cytochrome p450 inhibitor, cytochalasin D, ketamine, TGF-beta, interleukin-10, pentoxifylline, BRL 61,063, a calcium antagonist, curcumin, kappa-selective opioid agonist U50,488H (trans-3,4-dichloro-N-methyl-N-[7-(1-pyrrolidinyl)cyclohexyl]benzene-acetamide methanesulfonate), alendronate, tetrandrine, sulfasalazine, epinephrine, BMS-182123, adenosine, E3330, nicotine, IVIG, cardiotrophin-1, KB-R7785, CGRP, ligustrazine, dexanabinol, iloprost, activated protein C, a growth hormone, spermine, FR-167653, gm-6001, estradiol, aspirin, amiodarone, or a combination thereof.

In some embodiments, fibroblasts are provided to a subject in combination with one or more agents capable of inhibiting responsiveness to TNF-α. An agent capable of inhibiting responsiveness to TNF-α may be any agent capable of reducing or preventing an immune response caused by TNF-α stimulation in a subject. In some embodiments, the agent capable of inhibiting responsiveness to TNF-α is ibuprofen, indomethacin, Nedocromil sodium, cromolyn (sodium cromoglycate), a spleen derived factor, pentoxifylline, NG-methyl-L-arginine, dexamethasone, chlorpromazine, activated alpha 2 macroglobulin, serum amyloid A protein, a neutrophil derived proteolytic enzyme, phentolamine, propranolol, a leukotriene inhibitor, nordihydroguaiaretic acid, genistein, butylated hydroxyanisole, CNI-1493, quercetin, gabexate mesylate, SM-12502, monoclonal nonspecific suppressor factor (MNSF), pyrrolidine dithiocarbamate (PDTC), and/or aprotinin.

In some embodiments, fibroblasts are provided to a subject together with one or more neuroprotective agents. Agents capable of protecting against neuronal death and/or injury include minocycline, erythropoietin, human chorionic gonadotropin, metformin, GLP-1, dimethylsulfoxide, felbamate, TGF-beta, aurintricarboxylic acid, amlodipine, MK-801, memantine, irbesartan, ebselen, green tea extract, BMP-6, minocycline, doxycycline, and ceftriaxone.

In some embodiments, fibroblasts are provided together with one or more agents capable of stimulating activity of endogenous neural progenitor cells. Agents capable of stimulating activity of endogenous neural progenitor cells include, for example, metformin.

In some embodiments, fibroblasts are treated or cultured with metformin prior to administration. In some embodiments, fibroblasts are cultured with metformin to augment angiogenic potential. Enhancement of angiogenic potential of fibroblasts may be assessed by measurement of surrogate cytokines (e.g., VEGF, EGF, IGF, FGF, PGF). Enhancement of angiogenic potential of fibroblasts may be assessed by direct injection of cells into animals suffering from ischemic insult. Other methods for assessment of therapeutic benefit of metformin preconditioning include, for example, assaying for: a) resistance to apoptosis; b) production of neurotrophic factors; c) induction of antioxidant enzymes such as superoxide dismutase; and d) homing activity, either assessed directly by chemotaxis assays towards a chemoattractant such as SDF-1, or expression of the chemokine receptor CXCR4.

Embodiments of the disclosure encompass methods of treating cerebral palsy comprising the steps of: a) optionally identifying an individual, such as a patient, with cerebral palsy; and b) administering a therapeutically effective number of fibroblasts, such as at a therapeutically sufficient frequency. Further embodiments encompass methods of reducing the likelihood of cerebral palsy in an individual, such as a patient or subject, at risk for cerebral palsy, comprising the steps of: a) optionally identifying a patient with cerebral palsy; and b) administering a therapeutically effective number of fibroblasts, including at a therapeutically sufficient frequency. Additional embodiments include methods of treating white matter injury or reducing the likelihood that white matter injury will result in cerebral palsy in a patient or subject in need thereof, comprising administering a therapeutically effective amount of fibroblasts, including at a therapeutically sufficient frequency. The frequency may be once a day, twice a day, three times a day, once a week, twice a week, three times a week, once a month, once biweekly, and so forth.

In some cases, the patient or subject may be a neonate, infant or child of an age no greater than about 4 years. In specific cases, the patient or subject is an infant or child of an age no greater than about 2 years. In specific cases, the patient or subject is a neonate, including a preterm neonate. The fibroblasts may be of any kind, including those selected from the group of tissues consisting of: a) adipose tissue; b) dermal tissue; c) bone marrow; d) peripheral blood; e) Wharton's Jelly; f) placenta; g) omentum; h) mobilized peripheral blood; and i) a mixture thereof. In specific cases, the fibroblasts are proliferating at a rate of 14-21 hours per cell multiplication, for example. In specific embodiments, the fibroblasts secrete one or more specific cytokines, including one or more interleukins. In particular embodiments, the fibroblasts secrete about 0.1 pg-77 pg of interleukin 1 per culture of 1 million fibroblasts on a 75% confluent surface. In specific cases, the fibroblasts secrete about 1 pg-500 pg of interleukin FGF-1 per culture of 1 million fibroblasts on a 75% confluent surface.

In specific embodiments, fibroblasts of any kind and function may be utilized in the disclosure. In specific cases, the fibroblasts substantially decrease ability of responding T cells to proliferate in a mixed lymphocyte reaction. In specific cases, a decrease, including a significant decrease, in proliferation comprises a decrease of more than 20% as compared to a control mixed lymphocyte reaction in which fibroblasts are not added, for example.

The fibroblasts utilized in methods of the disclosure may be treated or exposed to any one or more agents of any kind and for any purpose. In specific embodiments, the fibroblasts are treated with one or more agents that augment immune modulatory activity of the fibroblasts. In specific cases, the fibroblasts are treated with human chorionic gonadotropin (hCG) to augment immune modulatory activity. In particular embodiments, hCG is administered to cells at a concentration of 1 nM to 1 µM per 1 million fibroblasts. The hCG may be administered to cells at a concentration of 10 nM to 100 nM per 1 million fibroblasts. The fibroblasts may be treated with an effective amount of oxytocin to augment immune modulatory activity.

IV. Fibroblasts and Cultured Cells

Aspects of the present disclosure comprise cells useful in therapeutic methods and compositions. Cells disclosed herein include, for example, fibroblasts, stem cells (e.g., hematopoietic stem cells or mesenchymal stem cells), and endothelial progenitor cells. Cells of a given type (e.g., fibroblasts) may be used alone or in combination with cells of other types. For example, fibroblasts may be isolated and provided to a subject alone or in combination with one or more stem cells. In one example, fibroblasts are isolated and provided to a subject together with one or more endothelial progenitor cells. In some embodiments, disclosed herein are fibroblasts capable of stimulating tissue regeneration, immune modulation, angiogenesis, and/or neurogenesis. In some embodiments, disclosed herein are fibroblasts capable of stimulating neurogenesis.

Compositions of the present disclosure may be obtained from isolated fibroblast cells or a population thereof capable of proliferating and differentiating into ectoderm, mesoderm, or endoderm. In some embodiments, an isolated fibroblast cell expresses at least one of Oct-4, Nanog, Sox-2, KLF4, c-Myc, Rex-1, GDF-3, LIF receptor, CD105, CD117, CD344 or Stella markers. In some embodiments, an isolated fibroblast cell does not express at least one of MHC class I, MHC class II, CD45, CD13, CD49c, CD66b, CD73, CD105, or CD90 cell surface proteins. Such isolated fibroblast cells may be used as a source of conditioned media. The cells may be cultured alone, or may by cultured in the presence of other cells in order to further upregulate production of growth factors in the conditioned media.

Fibroblasts may be expanded and utilized by administration themselves, or may be cultured in a growth media in order to obtain conditioned media. The term Growth Medium generally refers to a medium sufficient for the culturing of fibroblasts. In particular, one presently preferred medium for the culturing of the cells of the invention herein comprises Dulbecco's Modified Essential Media (DMEM). Particularly preferred is DMEM-low glucose (also DMEM-LG herein) (Invitrogen®, Carlsbad, Calif.). The DMEM-low glucose is preferably supplemented with 15% (v/v) fetal bovine serum (e.g. defined fetal bovine serum, Hyclone™ Logan Utah), antibiotics/antimycotics (preferably penicillin (100 Units/milliliter), streptomycin (100 milligrams/milliliter), and amphotericin B (0.25 micrograms/milliliter), (Invitrogen®, Carlsbad, Calif.)), and 0.001% (v/v) 2-mercaptoethanol (Sigma®, St. Louis Mo.). In some cases different growth media are used, or different supplementations are provided, and these are normally indicated as supplementations to Growth Medium. Also relating to the present invention, the term standard growth conditions, as used herein refers to culturing of cells at 37° C., in a standard atmosphere comprising 5% $CO_2$, where relative humidity is maintained at about 100%. While the foregoing conditions are useful for culturing, it is to be understood that such conditions are capable of being varied by the skilled artisan who will appreciate the options available in the art for culturing cells, for example, varying the temperature, $CO_2$, relative humidity, oxygen, growth medium, and the like.

Also disclosed herein are cultured cells. Various terms are used to describe cells in culture. Cell culture refers generally to cells taken from a living organism and grown under controlled condition ("in culture" or "cultured"). A primary cell culture is a culture of cells, tissues, or organs taken directly from an organism(s) before the first subculture. Cells are expanded in culture when they are placed in a growth medium under conditions that facilitate cell growth and/or division, resulting in a larger population of the cells. When cells are expanded in culture, the rate of cell proliferation is sometimes measured by the amount of time needed for the cells to double in number, or the "doubling time".

Fibroblast cells used in the disclosed methods can undergo at least 25, 30, 35, or 40 doublings prior to reaching a senescent state. Methods for deriving cells capable of doubling to reach $10^{14}$ cells or more are provided. Examples are those methods which derive cells that can double sufficiently to produce at least about $10^{14}$, $10^{15}$, $10^{16}$, or $10^{17}$ or more cells when seeded at from about $10^3$ to about $10^6$ cells/cm$^2$ in culture. Preferably these cell numbers are produced within 80, 70, or 60 days or less. In one embodiment, fibroblast cells used are isolated and expanded, and possess one or more markers selected from a group consisting of CD10, CD13, CD44, CD73, CD90, CD141, PDGFr-alpha, HLA-A, HLA-B, and HLA-C. In some embodiments, the fibroblast cells do not produce one or more of CD31, CD34, CD45, CD117, CD141, HLA-DR, HLA-DP, or HLA-DQ.

When referring to cultured cells, including fibroblast cells and vertebrae cells, the term senescence (also "replicative senescence" or "cellular senescence") refers to a property attributable to finite cell cultures; namely, their inability to grow beyond a finite number of population doublings (sometimes referred to as Hayflick's limit). Although cellular senescence was first described using fibroblast-like cells, most normal human cell types that can be grown successfully in culture undergo cellular senescence. The in vitro lifespan of different cell types varies, but the maximum lifespan is typically fewer than 100 population doublings (this is the number of doublings for all the cells in the culture to become senescent and thus render the culture unable to divide). Senescence does not depend on chronological time, but rather is measured by the number of cell divisions, or population doublings, the culture has undergone. Thus, cells made quiescent by removing essential growth factors are able to resume growth and division when the growth factors are re-introduced, and thereafter carry out the same number of doublings as equivalent cells grown continuously. Similarly, when cells are frozen in liquid nitrogen after various numbers of population doublings and then thawed and cultured, they undergo substantially the same number of doublings as cells maintained unfrozen in culture. Senescent cells are not dead or dying cells; they are resistant to programmed cell death (apoptosis) and can be maintained in their nondividing state for as long as three years. These cells are alive and metabolically active, but they do not divide.

In some cases, fibroblast cells are obtained from a biopsy, and the donor providing the biopsy may be either the individual to be treated (autologous), or the donor may be different from the individual to be treated (allogeneic). In cases wherein allogeneic fibroblast cells are utilized for an individual, the fibroblast cells may come from one or a plurality of donors.

The fibroblasts may be obtained from a source selected from the group consisting of: dermal fibroblasts; placental fibroblasts; adipose fibroblasts; bone marrow fibroblasts; foreskin fibroblasts; umbilical cord fibroblasts; hair follicle derived fibroblasts; nail derived fibroblasts; endometrial derived fibroblasts; keloid derived fibroblasts; and a combination thereof. In some embodiments, fibroblasts are dermal fibroblasts.

In some embodiments, fibroblasts are manipulated or stimulated to produce one or more factors. In some embodiments, fibroblasts are manipulated or stimulated to produce leukemia inhibitory factor (LIF), brain-derived neurotrophic factor (BDNF), epidermal growth factor receptor (EGF), basic fibroblast growth factor (bFGF), FGF-6, glial-derived neurotrophic factor (GDNF), granulocyte colony-stimulating factor (GCSF), hepatocyte growth factor (HGF), IFN-γ, insulin-like growth factor binding protein (IGFBP-2), IGFBP-6, IL-1ra, IL-6, IL-8, monocyte chemotactic protein (MCP-1), mononuclear phagocyte colony-stimulating factor (M-CSF), neurotrophic factors (NT3), tissue inhibitor of metalloproteinases (TIMP-1), TIMP-2, tumor necrosis factor (TNF-β), vascular endothelial growth factor (VEGF), VEGF-D, urokinase plasminogen activator receptor (uPAR), bone morphogenetic protein 4 (BMP4), IL1-a, IL-3, leptin, stem cell factor (SCF), stromal cell-derived factor-1 (SDF-1), platelet derived growth factor-BB (PDGFBB), transforming growth factors beta (TGβ-1) and/or TGβ-3. Factors from manipulated or stimulated fibroblasts may be present in conditioned media and collected for therapeutic use.

In some embodiments, fibroblasts are transfected with one or more angiogenic genes to enhance ability to promote neural repair. An "angiogenic gene" describes a gene encoding for a protein or polypeptide capable of stimulating or enhancing angiogenesis in a culture system, tissue, or organism. Examples of angiogenic genes which may be useful in transfection of fibroblasts include activin A, adrenomedullin, aFGF, ALK1, ALK5, ANF, angiogenin, angiopoietin-1, angiopoietin-2, angiopoietin-3, angiopoietin-4, bFGF, B61, bFGF inducing activity, cadherins, CAM-RF, cGMP analogs, ChDI, CLAF, claudins, collagen, connexins, Cox-2, ECDGF (endothelial cell-derived growth factor), ECG, ECI, EDM, EGF, EMAP, endoglin, endothelins, endostatin, endothelial cell growth inhibitor, endothelial cell-viability maintaining factor, endothelial differentiation shpingolipid G-protein coupled receptor-1 (EDG1), ephrins, Epo, HGF, TGF-beta, PD-ECGF, PDGF, IGF, IL8, growth hormone, fibrin fragment E, FGF-5, fibronectin, fibronectin receptor, Factor X, HB-EGF, HBNF, HGF, HUAF, heart derived inhibitor of vascular cell proliferation, Ill, IGF-2 IFN-gamma, α1β1 integrin, α2β1 integrin, K-FGF, LIF, leiomyoma-derived growth factor, MCP-1, macrophage-derived growth factor, monocyte-derived growth factor, MD-ECI, MECIF, MMP2, MMP3, MMP9, urokiase plasminogen activator, neuropilin, neurothelin, nitric oxide donors, nitric oxide synthases (NOSs), notch, occludins, zona occludins, oncostatin M, PDGF, PDGF-B, PDGF receptors, PDGFR-β, PD-ECGF, PAI-2, PD-ECGF, PF4, P1GF, PKR1, PKR2, PPAR-gamma, PPAR-gamma ligands, phosphodiesterase, prolactin, prostacyclin, protein S, smooth muscle cell-derived growth factor, smooth muscle cell-derived migration factor, sphingosine-1-phosphate-1 (SIP1), Syk, SLP76, tachykinins, TGF-beta, Tie 1, Tie2, TGF-β, TGF-β receptors, TIMPs, TNF-α, transferrin, thrombospondin, urokinase, VEGF-A, VEGF-B, VEGF-C, VEGF-D, VEGF-E, VEGF, VEGF(164), VEGI, and EG-VEGF. Fibroblasts transfected with one or more angiogenic factors may be used in the disclosed methods of treatment or prevention of cerebral palsy.

Under appropriate conditions, fibroblasts may be capable of producing interleukin-1 (IL-1) and/or other inflammatory cytokines. In some embodiments, fibroblasts of the present disclosure are modified (e.g., by gene editing) to prevent or reduce expression of IL-1 or other inflammatory cytokines. For example, in some embodiments, fibroblasts are fibroblasts having a deleted or non-functional IL-1 gene, such that the fibroblasts are unable to express IL-1. Such modified fibroblasts may be useful in the therapeutic methods of the present disclosure by having limited pro-inflammatory capabilities when provided to a subject. In some embodiments, fibroblasts are treated with (e.g., cultured with) TNF-α, thereby inducing expression of growth factors and/or fibroblast proliferation.

In some embodiments, fibroblasts of the present disclosure are used as precursor cells that differentiate following introduction into an individual (e.g., into the CNS of an individual). In some embodiments, fibroblasts are subjected to differentiation into a different cell type (e.g., neural cells) prior to introduction into the individual (e.g., into the CNS). For example, fibroblasts may be differentiated into cells that expresses at least one protein characteristic of a cell of the CNS, including but not limited to class III β-tubulin, the M subunit of neurofilaments, tyrosine hydroxylase, glutamate receptor subunits of the GluR1-4 and GluR6 classes, glial fibrillary acidic protein, myelin basic protein, brain factor 1, NeuN, NF-M, NSE, nestin, and trkA.

As disclosed herein, fibroblasts may secret one or more factors prior to or following introduction into an individual. Such factors include, but are not limited to, growth factors, trophic factors and cytokines. In some instances, the secreted factors can have a therapeutic effect in the individual. In some embodiments, a secreted factor activates the same cell. In some embodiments, the secreted factor activates neighboring and/or distal endogenous cells. In some embodiments, the secreted factor stimulated cell proliferation and/or cell differentiation. In some embodiments, fibroblasts secrete a cytokine or growth factor selected from human growth factor, fibroblast growth factor, nerve growth factor, insulin-like growth factors, hemopoietic stem cell growth factors, a member of the fibroblast growth factor family, a member of the platelet-derived growth factor family, a vascular or endothelial cell growth factor, and a member of the TGFβ family.

In some embodiments, the present disclosures utilizes exosomes derived from fibroblasts as a therapeutic modality. Exosomes derived from fibroblasts may be used in addition to, or in place of, fibroblasts in the various methods and compositions disclosed herein. Methods for exosomes isolation, quantification, and standardization have been described (142-164).

V. Administration of Therapeutic Compositions

The therapy provided herein may comprise administration of a therapeutic agents alone or in combination. Therapies may be administered in any suitable manner known in the art. For example, a first and second treatment may be administered sequentially (at different times) or concurrently (at the same time). In some embodiments, the first and second treatments are administered in a separate composition. In some embodiments, the first and second treatments are in the same composition.

Embodiments of the disclosure relate to compositions and methods comprising therapeutic compositions. The different therapies may be administered in one composition or in more than one composition, such as 2 compositions, 3 compositions, or 4 compositions. Various combinations of the agents may be employed.

The therapeutic agents of the disclosure may be administered by the same route of administration or by different routes of administration. In some embodiments, the cancer therapy is administered intravenously, intramuscularly, subcutaneously, topically, orally, transdermally, intraperitoneally, intraorbitally, by implantation, by inhalation, intrathecally, intraventricularly, or intranasally. In some embodiments, the antibiotic is administered intravenously, intramuscularly, subcutaneously, topically, orally, transdermally, intraperitoneally, intraorbitally, by implantation, by inhalation, intrathecally, intraventricularly, or intranasally. The appropriate dosage may be determined based on the type of disease to be treated, severity and course of the disease, the clinical condition of the individual, the individual's clinical history and response to the treatment, and the discretion of the attending physician.

The treatments may include various "unit doses." Unit dose is defined as containing a predetermined-quantity of the therapeutic composition. The quantity to be administered, and the particular route and formulation, is within the skill of determination of those in the clinical arts. A unit dose need not be administered as a single injection but may comprise continuous infusion over a set period of time. In some embodiments, a unit dose comprises a single administrable dose.

The quantity to be administered, both according to number of treatments and unit dose, depends on the treatment effect desired. An effective dose is understood to refer to an amount necessary to achieve a particular effect. In the practice in certain embodiments, it is contemplated that doses in the range from 10 mg/kg to 200 mg/kg can affect the protective capability of these agents. Thus, it is contemplated that doses include doses of about 0.1, 0.5, 1, 5, 10, 15, 20, 25, 30, 35, 40, 45, 50, 55, 60, 65, 70, 75, 80, 85, 90, 100, 105, 110, 115, 120, 125, 130, 135, 140, 145, 150, 155, 160, 165, 170, 175, 180, 185, 190, 195, and 200, 300, 400, 500, 1000 µg/kg, mg/kg, µg/day, or mg/day or any range derivable therein. Furthermore, such doses can be administered at multiple times during a day, and/or on multiple days, weeks, or months.

In certain embodiments, the effective dose of the pharmaceutical composition is one which can provide a blood level of about 1 µM to 150 µM. In another embodiment, the effective dose provides a blood level of about 4 µM to 100 µM; or about 1 µM to 100 µM; or about 1 µM to 50 µM; or about 1 µM to 40 µM; or about 1 µM to 30 µM; or about 1 µM to 20 µM; or about 1 µM to 10 µM; or about 10 µM to 150 µM; or about 10 µM to 100 µM; or about 10 µM to 50 µM; or about 25 µM to 150 µM; or about 25 µM to 100 µM; or about 25 µM to 50 µM; or about 50 µM to 150 µM; or about 50 µM to 100 µM (or any range derivable therein). In other embodiments, the dose can provide the following blood level of the agent that results from a therapeutic agent being administered to a subject: about, at least about, or at most about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 µM or any range derivable therein. In certain embodiments, the therapeutic agent that is administered to a subject is metabolized in the body to a metabolized therapeutic agent, in which case the blood levels may refer to the amount of that agent. Alternatively, to the extent the therapeutic agent is not metabolized by a subject, the blood levels discussed herein may refer to the unmetabolized therapeutic agent.

Precise amounts of the therapeutic composition also depend on the judgment of the practitioner and are peculiar to each individual. Factors affecting dose include physical and clinical state of the patient, the route of administration, the intended goal of treatment (alleviation of symptoms versus cure) and the potency, stability and toxicity of the particular therapeutic substance or other therapies a subject may be undergoing.

It will be understood by those skilled in the art and made aware that dosage units of µg/kg or mg/kg of body weight can be converted and expressed in comparable concentration units of µg/ml or mM (blood levels), such as 4 µM to 100 µM. It is also understood that uptake is species and organ/tissue dependent. The applicable conversion factors and physiological assumptions to be made concerning uptake and concentration measurement are well-known and would permit those of skill in the art to convert one concentration measurement to another and make reasonable comparisons and conclusions regarding the doses, efficacies and results described herein.

The disclosure encompasses that in order to transplant the cells of the present disclosure into a human, the cells may be prepared as described herein. In some embodiments, the cells are from a donor that has been screened and the donor is genetically different than the patient for which the cells are being transplanted into (i.e. allogeneic transplantation). In the case where cells are not from the patient, in some embodiments the blood type or haplotype compatibility is determined between the donor cell and the patient. Cells may be administered intravenously, or in some situations locally. Surgery may be performed using a Brown-Roberts-Wells computed tomographic (CT) stereotaxic guide. In this case, the patient is given local anesthesia in the scalp area and intravenously administered midazolam. The patient undergoes CT scanning to establish the coordinates of the region to receive the transplant. The injection cannula usually consists of a 17-gauge stainless steel outer cannula with a 19-gauge inner stylet. This is inserted into the brain to the correct coordinates, then removed and replaced with a 19-gauge infusion cannula that has been preloaded with about 30 μl of tissue suspension. The cells are slowly infused at a rate of about 3 μl/min as the cannula is withdrawn. Multiple stereotactic needle passes are made throughout the area of interest, approximately 4 mm apart. The patient is examined by CT scan postoperatively for hemorrhage or edema. Neurological evaluations are performed at various post-operative intervals, as well as PET scans to determine metabolic activity of the implanted cells.

In one embodiment, between about $10^5$ and about $10^{13}$ cells per 100 kg are administered to a human per infusion. In some embodiments, between about $1.5 \times 10^6$ and about $1.5 \times 10^{12}$ cells are infused per 100 kg. In some embodiments, between about $1 \times 10^9$ and about $5 \times 10^{11}$ cells are infused per 100 kg. In some embodiments, between about $4 \times 10^9$ and about $2 \times 10^{11}$ cells are infused per 100 kg. In some embodiments, between about $5 \times 10^8$ cells and about $1 \times 10^1$ cells are infused per 100 kg. In some embodiments, a single administration of cells is provided. In some embodiments, multiple administrations are provided. In some embodiments, multiple administrations are provided over the course of 3-7 consecutive days. In some embodiments, 3-7 administrations are provided over the course of 3-7 consecutive days. In some embodiments, 5 administrations are provided over the course of 5 consecutive days. In some embodiments, a single administration of between about $10^5$ and about $10^{13}$ cells per 100 kg is provided. In some embodiments, a single administration of between about $1.5 \times 10^8$ and about $1.5 \times 10^{12}$ cells per 100 kg is provided. In some embodiments, a single administration of between about $1 \times 10^9$ and about $5 \times 10^{11}$ cells per 100 kg is provided. In some embodiments, a single administration of about $5 \times 10^{10}$ cells per 100 kg is provided. In some embodiments, a single administration of $1 \times 10^{10}$ cells per 100 kg is provided. In some embodiments, multiple administrations of between about $10^5$ and about $10^{13}$ cells per 100 kg are provided. In some embodiments, multiple administrations of between about $1.5 \times 10^8$ and about $1.5 \times 10^{12}$ cells per 100 kg are provided. In some embodiments, multiple administrations of between about $1 \times 10^9$ and about $5 \times 10^{11}$ cells per 100 kg are provided over the course of 3-7 consecutive days. In some embodiments, multiple administrations of about $4 \times 10^9$ cells per 100 kg are provided over the course of 3-7 consecutive days. In some embodiments, multiple administrations of about $2 \times 10^{11}$ cells per 100 kg are provided over the course of 3-7 consecutive days. In some embodiments, 5 administrations of about $3.5 \times 10^9$ cells are provided over the course of 5 consecutive days. In some embodiments, 5 administrations of about $4 \times 10^9$ cells are provided over the course of 5 consecutive days. In some embodiments, 5 administrations of about $1.3 \times 10^{11}$ cells are provided over the course of 5 consecutive days. In some embodiments, 5 administrations of about $2 \times 10^{11}$ cells are provided over the course of 5 consecutive days.

VI. Kits of the Disclosure

Any of the cellular and/or non-cellular compositions described herein or similar thereto may be comprised in a kit. In a non-limiting example, one or more reagents for use in methods for preparing fibroblasts or derivatives thereof (e.g., exosomes derived from fibroblasts) may be comprised in a kit. Such reagents may include cells, vectors, one or more growth factors, vector(s) one or more costimulatory factors, media, enzymes, buffers, nucleotides, salts, primers, compounds, and so forth. The kit components are provided in suitable container means.

Some components of the kits may be packaged either in aqueous media or in lyophilized form. The container means of the kits will generally include at least one vial, test tube, flask, bottle, syringe or other container means, into which a component may be placed, and preferably, suitably aliquoted. Where there are more than one component in the kit, the kit also will generally contain a second, third or other additional container into which the additional components may be separately placed. However, various combinations of components may be comprised in a vial. The kits of the present disclosure also will typically include a means for containing the components in close confinement for commercial sale. Such containers may include injection or blow molded plastic containers into which the desired vials are retained.

When the components of the kit are provided in one and/or more liquid solutions, the liquid solution is an aqueous solution, with a sterile aqueous solution being particularly useful. In some cases, the container means may itself be a syringe, pipette, and/or other such like apparatus, or may be a substrate with multiple compartments for a desired reaction.

Some components of the kit may be provided as dried powder(s). When reagents and/or components are provided as a dry powder, the powder can be reconstituted by the addition of a suitable solvent. It is envisioned that the solvent may also be provided in another container means. The kits may also comprise a second container means for containing a sterile acceptable buffer and/or other diluent.

In specific embodiments, reagents and materials include primers for amplifying desired sequences, nucleotides, suitable buffers or buffer reagents, salt, and so forth, and in some cases the reagents include apparatus or reagents for isolation of a particular desired cell(s).

In particular embodiments, there are one or more apparatuses in the kit suitable for extracting one or more samples from an individual. The apparatus may be a syringe, fine needles, scalpel, and so forth.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

EXAMPLES

The following examples are included to demonstrate particular embodiments of the invention. It should be appreciated by those of skill in the art that the techniques disclosed in the examples that follow represent techniques discovered by the inventors to function well in the practice of the methods of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1: Neurobehavioral Evaluation of Fibroblasts in Treatment of an In Vivo Cerebral Palsy Model Sprague-Dawley (SD) rats aged 7 days and weighting 20±5 grams are given free access to eating and drinking in a room with 12 h day/night cycle, temperature of (23-25) ° C., humidity of 45-60% as well as regular disinfection and ventilation.

A group of 12 rats are randomly selected as a sham group. The rat model of cerebral palsy (CP) is established by ligating the left common carotid artery and anoxia for 2 h in the remaining 60 rats. The anesthetized rats are intraperitoneally injected with 1% pentobarbital sodium for anesthesia. The experimental rats are placed in supine on the surgical plate, fixed their limbs and heads, and disinfected with iodophor before the neck. The left common carotid artery is found in the triangle area at the junction of the inner side of the sternocleidomastoid and the anterior part of the neck, and the incision is sutured with a No. 0 wire. The experimental rats are immediately placed in an anoxic chamber at 37 C. The mixture of 8% oxygen and 92% nitrogen is continuously filled with the flow rate of 1 L/min for 2 h. The whole process of anoxia is continuously monitored by an oxygen meter. In the sham group, the common carotid artery is isolated, and no ligation is performed without hypoxia treatment.

Cells were obtained from ATCC and grown in DMEM media with 10% fetal calf serum, and cells are administered in a total concentration of 500,000 cells per mouse.

Rats are divided into 5 groups, 12 rats in each group:
1. CP group (establish a rat model of ischemic and anoxic CP without other treatment),
2. CP+PBS group (on the 3rd day after modeling, stereotactic injection of 2 μL PBS into the left lateral ventricle of CP rats),
3. CP+BMSCs group (on the 3rd day after modeling, stereotactic injection of 2 μL BMSCs into the left lateral ventricle of CP rats),
4. CP+fat MSC group (on the 3rd day after modeling, stereotactic injection of 2 μL fat MSC into the left lateral ventricle of CP rats), and
5. CP+fibroblast group (on the 3rd day after modeling, stereotactic injection of 2 μL fibroblasts into the left lateral ventricle of CP rats).

Neurobehavioral assessment of rats is conducted at 3 weeks after modeling.

A) Morris water maze test: The rats facing the water wall are placed in water several times from 4 water entry points to record the time when they found the hidden platform under the water surface, namely the escape latency.
B) Suspension test: The rat forelegs grabbed the 0.5 cm glass rod and observed the time of falling: <10 s is 1 point, 10-30 s is 2 points, 31-119 s is 3 points, 2-5 min is 4 points, >5 min is 5 points.
C) Slope test: The rats are placed on a 45° slope to observe the turning time.
D) Open field test: The covered box with length and width of 36 cm is divided into 9 equal size lattices at the bottom of the box, and then to record the activity of rats. More than ½ of the body part of the rat entered the adjacent grid is 1 point, and the hind limb of the rat stood is 1 point. The sum of the two points is the total score.

In one example, no improvement is observed in mice receiving saline, mild improvement is observed in mesenchymal stem cell recipients (bone marrow and adipose), and significant improvement is observed in mice receiving fibroblasts.

What is claimed is:

1. A method of treating cerebral palsy in a subject in need thereof, comprising providing to the subject a therapeutically effective amount of a composition comprising exosomes derived from fibroblasts.

2. The method of claim 1, wherein the subject is about four years of age or less.

3. The method of claim 2, wherein the subject is about two years of age or less.

4. The method of claim 1, wherein the subject is a neonate.

5. The method of claim 4, wherein the neonate is a preterm neonate.

6. The method of claim 1, wherein the fibroblasts are fibroblasts obtained from placenta, cord blood, peripheral blood, omentum, hair follicle, skin, bone marrow, adipose tissue, or Wharton's Jelly.

7. The method of claim 1, wherein the fibroblasts are capable of proliferating in vitro at a rate of between 14 and 21 hours per cell multiplication.

8. The method of claim 1, further comprising providing to the subject one or more neuroprotective agents.

9. The method of claim 8, wherein the neuroprotective agent is erythropoietin, human chorionic gonadotropin, metformin, GLP-1, dimethylsulfoxide, felbamate, TGF-beta, aurintricarboxylic acid, amlodipine, MK-801, memantine, irbesartan, ebselen, green tea extract, BMP-6, minocycline, doxycycline, ceftriaxone, or a combination thereof.

10. The method of claim 1, wherein the cerebral palsy is congenital.

11. The method of claim 1, wherein the cerebral palsy is acquired.

* * * * *